United States Patent [19]

Bucaram et al.

[11] 3,722,592

[45] Mar. 27, 1973

[54] PARAFFIN DEPOSITION INHIBITION IN OIL

[75] Inventors: Salim M. Bucaram, Plano; Alfred L. Mortimer, Richardson, both of Tex.

[73] Assignee: Atlantic Richfield Company, New York, N.Y.

[22] Filed: Dec. 14, 1971

[21] Appl. No.: 207,987

[52] U.S. Cl.................166/304, 252/8.3, 252/8.55 B
[51] Int. Cl...........................E21b 43/00, C09k 3/00
[58] Field of Search.......166/304, 279, 310; 252/8.3, 252/8.55 B

[56] References Cited

UNITED STATES PATENTS

| 2,364,222 | 12/1944 | Kaufman | 252/8.55 |
| 2,204,967 | 6/1940 | Moser | 252/8.3 |
| 3,051,653 | 8/1962 | Skolaut et al. | 252/8.3 |
| 3,276,519 | 10/1966 | Knox et al. | 166/279 |
| 3,640,824 | 2/1972 | Bucaram et al. | 252/8.3 |
| 3,682,249 | 8/1972 | Fischer et al. | 166/304 X |

OTHER PUBLICATIONS

Bucaram, S. M., "An Improved Paraffin Inhibitor," Journal of Petroleum Technology, vol. XIX, No. 2, Feb. 1967, pp. 150–153 and 156.
Reistle et al., "Paraffins and Congealing–Oil Problems," Bulletin 348, published 1932 by U.S. Dept. of Commerce, Bureau of Mines, pp. 10 and 11.

*Primary Examiner*—Stephen J. Novosad
*Attorney*—Blucher S. Tharp et al.

[57] ABSTRACT

A method for inhibiting the deposition of paraffin in liquid oil either in the oil well, gas wells, etc., or on the earth's surface by utilizing a stable aqueous emulsion of polyethylene wherein the polyethylene is branched at least in part and has a molecular weight in excess of 6,000, the emulsifier being selected from the group consisting of anionic, nonionic, and cationic emulsifiers.

30 Claims, No Drawings

PARAFFIN DEPOSITION INHIBITION IN OIL

BACKGROUND OF THE INVENTION

U. S. Pat. application Ser. No. 508,834, filed Nov. 19, 1965, and now U.S. Pat. No. 3,640,824, of common assignee, the disclosure of which is incorporated herein by reference, discloses that a branched chain polyethylene having a molecular weight in excess of 6,000 is a paraffin deposition inhibitor in oil. This application also discloses that one way to incorporate polyethylene in a wellbore is to disperse polyethylene powder in naphthalene and the like to form a solid stick which can then be introduced into the wellbore.

Venezuelan patent Inscription Number 176-63, the disclosure of which is incorporated herein by reference, discloses that polyethylene generally unrestricted as to its branching and molecular weight is useful as a paraffin inhibitor in crude oil that does not contain substantial amounts of asphaltenes. This patent discloses dispersing the polyethylene in an aliphatic, cyclo-aliphatic, or liquid aromatic hydrocarbon or mixture of hydrocarbon such as gasoline or gas oil and then using this dispersion as a stabilizing agent in crude petroleum.

Canadian Pat. No. 827,619, the disclosure of which is incorporated herein by reference, discloses polyethylene emulsions and their preparation and teaches that these emulsions give new and surprising results when employed as treating agents for fibrous materials, including textiles, leather, paper and the like.

SUMMARY OF THE INVENTION

It has now been found that certain polyethylene emulsions can be used as paraffin deposition inhibitors for oil and can be employed in methods which give improved and longer-lasting paraffin deposition inhibition both in and out of the oil well.

The emulsions of this invention can be applied more effectively in the oil than can solid sticks or the dispersions of the Venezuelan patent. The emulsions of this invention can be widely dispersed outwardly of the wellbore in the oil producing formation and the polyethylene agglomerated and deposited in the interior of the oil producing fromation which was not possible with solid sticks or the dispersions of the Venezuelan patent. The emulsions can contain up to 50 weight percent or higher of polyethylene, which was not possible with the dispersions of the Venezuelan patent, so that a greater quantity of polyethylene per unit volume of carrier or vehicle can be used.

This invention relates to a method for inhibiting the deposition of paraffin in an oil well comprising introducing into the wellbore a polyethylene emulsion as described hereinafter in detail, the emulsion being introduced into the wellbore in an amount effective to inhibit paraffin deposition without plugging any oil bearing formation in the wellbore.

In another aspect, this invention relates to a method as above described wherein the emulsion after introduction into the wellbore is displaced outwardly of the wellbore into an oil bearing formation.

An additional aspect of this invention is the treatment of the emulsion after displacement into the oil bearing formation to cause substantial deposition of polyethylene from the emulsion in the interior of the oil bearing formation.

Another aspect of this invention is a method for inhibiting the deposition of paraffin from liquid oil by incorporating the emulsion of this invention as hereinafter described in the liquid oil in an effective paraffin deposition inhibiting amount.

Accordingly, it is an object of this invention to provide new and improved methods for inhibiting paraffin deposition in oil. It is another object to provide new and improved methods for treating wells for paraffin deposition inhibition. It is another object to provide a new and improved method for treating oil producing formations with paraffin deposition inhibitor. It is another object to provide new and improved methods for imparting to an oil well longer term protection against paraffin deposition than was heretofore possible.

Other aspects, objects, and advantages of this invention will be apparent to those skilled in the art from this disclosure and the appended claims.

DETAILED DESCRIPTION OF THE INVENTION

In accordance with this invention, the polyethylene emulsion is mixed with liquid oil on the surface of the earth, mixed with oil in the wellbore, or mixed with oil in an oil producing formation as the oil passes from that formation into the wellbore for subsequent production to the earth's surface.

In one method according to this invention the polyethylene emulsion is mixed with liquid oil to render the liquid oil more resistant to paraffin deposition. The incorporation of the emulsion in the oil is accomplished by any physical mixing at ambient conditions of temperature and pressure. Generally, the amount of emulsion incorporated in the liquid oil is an amount sufficient to provide at least about 0.05 ppm polyethylene in the oil. The oil treated can be crude oil as produced from a wellbore, treated crude oil such as that which has been dewatered or otherwise treated for transportation in a pipeline or the like, or refined oil such as fractions of crude oil, e.g., fuel oil, diesel oil, and the like.

Additional methods according to this invention include (1) introducing the emulsion into a wellbore so that oil from an oil producing formation which is pierced by the wellbore mixes with the emulsion in the wellbore and (2) introducing the emulsion into the wellbore and thereafter displacing at least part of the introduced emulsion outwardly of the wellbore into one or more oil producing formations so that oil is mixed with the emulsion while still in the oil producing formation and before the oil reaches the wellbore. In both such methods, care should be used so that sufficient emulsion is employed to achieve the desired paraffin deposition inhibiting results without substantial plugging of the pores or fractures in the oil bearing formation or formations of the well. This is necessary so that oil can continue to be produced from the formations while mixing with the emulsion. The use of an amount of emulsion which avoids plugging of the formation is particularly necessary when the method is practiced wherein the emulsion is displaced outwardly of the wellbore into an oil bearing formation or formations.

In the practice of the method where the emulsion is displaced outwardly of the wellbore, substantially any method for achieving this outward displacement can be employed. A particularly useful method is the application of pressure such as liquid or gas pressure to the interior of the wellbore, thus forcing fluid in the wellbore outwardly therefrom into the pores of the formations penetrated by the wellbore. This is often referred to as a squeeze treatment.

The amount of pressure employed can vary widely from that which is just sufficient to force fluids in the wellbore into the pores of the oil bearing formation without inducing fractures in the formation up to and including pressures sufficient to cause fracturing of the oil bearing formation thereby creating larger openings for the entry of the emulsion.

In the method wherein the emulsion is displaced into a formation, to prevent the emulsion from being immediately substantially all washed back into the wellbore by oil or other fluids being produced from the formation into the wellbore, the emulsion can be broken in situ in the formation to cause separation of polyethylene from the emulsion and deposition of the separated polyethylene in the formation. Since the polyethylene is sparingly soluble in oil, once it is separated from the emulsion and deposited in situ in the formation it will only very slowly dissolve in produced oil. In this way very long-term paraffin inhibition can be achieved in a well. The solubility of polyethylene in oil varies widely depending upon the composition of the particular oil (e.g., its aromatic to aliphatic ratio), the temperature of the oil, the molecular weight of the polyethylene, and the like, and, therefore, cannot be accurately quantified.

The breaking of the emulsion in situ in a formation can be achieved in any conventional manner known in the art such as by heating, by the introduction of an emulsion breaking agent, and the like, so long as the desired result of separation of the polymer from the emulsion in the formation is achieved. Normally, separation is achieved by causing the dispersed polymer micelle-sized particles to agglomerate into macro-size particles which, because of their larger size, remain in the interstices of the porous formation or the fractures, or other openings in the formation to thereafter be slowly dissolved in oil which passes thereover on its way toward the wellbore. A particularly suitable technique for breaking the emulsion in situ in a formation is the contacting of the emulsion with an amount of salt water which is effective to cause substantial deposition of polyethylene from the emulsion. Salt water, in accordance with this invention, is any water which contains 1,000 ppm or greater of dissolved salts, usually the alkali metal salts of halides, bicarbonates, carbonates, sulfates, sulfites, phosphates, phosphites, nitrates, and nitrites, particularly alkali metal salts of chlorides, bicarbonates, and sulfates. The mixing of salt water with the emulsion causes the polyethylene particles to agglomerate and separate from the continuous water phase of the emulsion. The amount of salt water employed can vary widely depending upon the degree of separation of polyethylene desired because care must be taken that sufficient polyethylene is deposited to achieve paraffin deposition inhibition while avoiding depositing so much polyethylene that the formation is plugged, thereby preventing further production of oil from that formation. Generally, at least about 10 weight percent salt water based on the weight of the emulsion can be employed. Equal parts of salt water and emulsion can be used as well as major amounts of salt water in relation to the emulsion.

In a situation where the emulsion is to be utilized as a spearhead and dispersed into a formation, it can be desirable to dilute or extend the emulsion, particularly when fracturing is not present and not desired in the formation, with water or other liquids which are soluble in water, such as glycols. Dilution of the emulsion somewhat renders same more easily forced into the pores of the formation. The emulsion should be diluted in such a case with fresh water, i.e., water containing less than 1,000 ppm dissolved salts as defined hereinabove for salt water.

The salt water used to break the emulsion can come from a source on the earth's surface or under the earth's surface or both. For example, after the emulsion is dispersed into a formation, salt water can be introduced into the wellbore from the earth's surface and then injected into the formation for mixing with emulsion in the formation. This surface-injected salt water is referred to as an "overflush." However, the emulsion can also be broken by contact with salt water present in the oil bearing formation and being produced outwardly with the oil toward the wellbore. Thus, the emulsion can be broken by salt water which is produced from the oil bearing formation itself as well as salt water injected from the earth's surface.

The emulsions employed in the methods of this invention are stable, aqueous, polyethylene emulsion wherein the continuous phase is aqueous, i.e., water or water containing water soluble liquids such as low molecular weight polyols and the like, while the dispersed phase is normally solid, polyethylene particles. The polyethylene is nonionic. Any emulsifier or combination of emulsifiers which will produce a stable emulsion as described herein can be used. Anionic, nonionic or cationic emulsifiers can be employed with anionic and nonionic emulsifiers being preferred due to economic and availability considerations.

The polyethylene particle can be in the size range of micelle groups up to about one micron and are preferably in the size range of from about 0.02 to about 0.5 micron. The polyethylene can be oxidized or nonoxidized. Mechanical emulsions can contain a broad particle size range from submicron size to particles so large they tend to segregate and precipitate from the continuous phase of the emulsion. The polyethylene should be branched, i.e., at least 10 percent branched, preferably at least about 25 percent branched, and should have a molecular weight in excess of about 6,000, preferably above 20,000, as determined by the viscosity method. The polyethylene can contain as much as 50 percent branching or even higher. The branched polyethylene structure is one in which the carbon atoms in the polymer chain contain either alkyl branches or branched vinyl structures, or both. The percent branching refers to the weight percent of branched carbon atoms in the polymer chain, e.g., per 1,000 carbons, and is determined by infrared spectra. Linear polyethylene has little effect on paraffin deposition from crude oil whereas branched polyethylene induces a reduction in the size of precipitated paraffin crystals and prevents agglomeration of these crystals. Also, branched polyethylene of molecular weight below about 6,000 has very little appreciable effect on crude oil as far as paraffin deposition inhibition goes.

The amount of emulsion employed in any of the methods of this invention varies widely depending upon the results desired and the particular situation, although in all cases the emulsion is employed in an amount effective to inhibit paraffin deposition. When the emulsion is incorporated into oil it is preferably incorporated in an amount sufficient to provide at least about 0.05 ppm polyethylene in the produced oil. When the emulsion is added to a wellbore to mix with oil in the wellbore or to be displaced outwardly into one or more formations, the emulsion is preferably introduced into the wellbore in an amount of at least about 0.5 gallon, or put another way, is introduced into the wellbore in an amount sufficient to provide at least about 0.05 ppm of polyethylene in the crude oil produced from the wellbore. Although the maximum amount of emulsion employed is determined by economic considerations, generally, amounts greater than about 5,000 ppm of polyethylene in the oil are not used.

The branched polyethylene useful in the emulsions of this invention is commercially available in solid, powder form, or can be formed (polymerized) in emulsion by conventional emulsion polymerization techniques known in the art. A particularly useful emulsion polymerization technique is one wherein ethylene monomer is polymerized in an aqueous medium using an effective catalytic amount of at least one water soluble alkali metal persulphate and in the presence of an emulsifier such as any of those set forth hereinbelow.

As stated above, the emulsifier can be any which will give the desired stable emulsion. By stable emulsion, it is meant an emulsion wherein the dispersed phase is substantially homogeneously distributed in the continuous phase and remains substantially homogeneously distributed while remaining at rest at ambient temperature and pressure for at least 24 hours. Thus, the stable emulsions of this invention when sitting at atmospheric temperatures and without mixing or other substantial physical disturbance will maintain the dispersed phase evenly distributed in the continuous phase for a substantial period of time, even weeks or months.

Although a broad range of emulsifiers is useful, preferred emulsifiers include water soluble salts (water soluble salts herein refers to any water soluble salt, particularly alkali metal salts, unless otherwise specified) of sulfonated hydrocarbons such as sulfonated alkylbenzene wherein the alkyl radical is linear or branched and contains from eight to 14 carbon atoms per molecule, inclusive, alkylphenoxy polyoxyethylene glycol having the structure

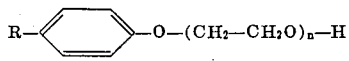

where R is an alkyl group containing eight or nine carbon atoms and $n$ is from 7 to 15, water soluble salts of saturated or unsaturated fatty acids having from 12 to 18, inclusive, carbon atoms per molecule, water soluble salts of sulfates of saturated fatty alcohols having from 12 to 18, inclusive, carbon atoms per molecule, and water soluble salts of sulfates of ethoxylated saturated fatty alcohols having from 12 to 18, inclusive, carbon atoms per molecule and combinations thereof. The R group can be linear or branched alkyl groups. The emulsifiers are employed in an effective emulsifying amount which will vary widely depending upon the particular emulsifier(s) used and the particular polyethylene employed.

Any liquid soluble in water and nondeleterious to the emulsifier and the polyethylene can be added to the emulsion to thin or otherwise extend the emulsion or for other reasons such as to impart to the emulsion a lower freezing point, an enhanced dispersibility in oil, and the like. For example, freezing point depressing agents which are soluble in water and otherwise nonharmful to the stability of the emulsion can be added and will dissolve in the continuous aqueous phase. Ethylene glycol and similar polyols are particularly useful because, in addition to lowering the freezing point and thinning the emulsion without adversely affecting its stability or the homogeneity of the emulsion, these chemicals further enhance the dispersibility of the emulsion, particularly the polyethylene, in the oil. By enhancing the dispersibility, there is a more intimate contact of polyethylene and oil is provided, thereby achieving even better paraffin deposition inhibition.

EXAMPLE I

A Wyoming crude oil which contained dissolved paraffin was treated for paraffin deposition inhibition using two different commercially available aqueous polyethylene emulsions. One emulsion contained an anionic emulsifier and 40.4 weight percent polyethylene particles based on the total weight of the emulsion while the other employed a nonionic emulsifier and contained 40.8 weight percent polyethylene particles based on the total weight of the emulsion. In both emulsions the polyethylene had at least 10 weight percent branching and a molecular weight in excess of 6,000. The crude oil was split into three 1,000 cubic centimeter (cc) portions. The first portion had no emulsion or other paraffin inhibiting agent added thereto. The second portion had the anionic emulsion added thereto in the amount of 1 cc. The third portion had the nonionic emulsion added thereto in the amount of 1 cc. The second and third portions were mechanically mixed until a homogeneous dispersion in the oil was obtained. The mixing was carried out at room temperature and pressure.

All three portions were then heated to 160° F. and allowed to cool to room temperature. Thereafter, slides were prepared of each portion for study under a microscope for comparison of paraffin crystal size precipitated in each portion.

The paraffin crystal size in the first (untreated) portion was more than a thousand times larger on the average than the paraffin crystal size in either of the second and third portions. This indicates that the polyethylene emulsions added to the second and third portions of crude oil prevented the agglomeration of paraffin particles and would therefore inhibit the deposition of paraffin as compared to the untreated crude oil.

EXAMPLE II

An anionic aqueous emulsion of polyethylene is prepared by polymerizing ethylene monomer in the presence of sodium persulfate and an anionic emulsifier composed of sodium salts of saturated fatty acids having from 12 to 18 carbon atoms per molecule, inclusive. The molecular weight of the polymer is greater than 6,000 and has at least 10 weight percent branching. The emulsion contains about 50 weight percent polyethylene solid particles in the size range of from about 0.02 to 0.5 micron.

The emulsion is mixed with fresh water in the ratio of 27½ gallons of emulsion to 550 gallons of fresh water. This mixture, referred to as a spearhead, is dumped into a wellbore annulus and then squeezed back into the oil producing formation by the hydrostatic pressure of fresh water being dumped into the wellbore on top of the spearhead.

By displacing the spearhead outwardly of the wellbore into the formation with fresh water, the well is treated for paraffin deposition inhibition for a long term, e.g., months, before additional treatment for paraffin deposition inhibition is necessary.

The above process is repeated except that the fresh water used to displace the emulsion from the bottom of the wellbore into the formation is replaced with salt water to cause in situ deposition of agglomerated polyethylene particles in the formation for even longer-term paraffin deposition protection.

If the formation is sensitive to water, particularly fresh water, the emulsion can be displaced into the formation with oil such as crude oil produced from the wellbore being treated or at least from the field in which that well is located. In this connection, two oil wells in Oklahoma were treated with an anionic polyethylene emulsion containing 55.8 weight percent polyethylene based on the total weight of the emulsion, the polyethylene having at least 10 percent branching and a molecular weight greater than 6,000. Both wells were completed in the Morrow formation. The first well produced 30 barrels of oil per day with no water and had a history of a very severe paraffin problem. The well had to be treated once a month with hot oil down the casing to keep the sucker rods and downhole pump from sticking due to paraffin deposition thereon. Twenty-seven and one-half gallons of the emulsion was diluted with 10 barrels (55-gallon barrels) of fresh water and pumped into the formation under a pressure of 50 psi using 50 barrels of crude oil from the well as the displacing liquid overflush. Four months after this treatment with the polyethylene emulsion a check was made to see if paraffin build-up was present. There was no paraffin build-up found.

The second well made 90 barrels of oil per day and no water. This well had a history of severe paraffin problems and required hot oiling of the flow line on the earth's surface once a month and cutting of paraffin out of the downhole tubing twice a month. The well was treated in the same manner as described above for the first well except that the displacement pressure was 1,300 psi instead of 50 psi. After three months the flow line had not required any hot oiling for paraffin removal and the paraffin cutting from the tubing had been reduced to once a month.

Reasonable variations and modifications are possible within the scope of this disclosure without departing from the spirit and scope of this invention.

The embodiments of the invention in which an exclusive property or privilege is claimed are defined as follows:

1. A method for inhibiting the deposition of paraffin in an oil well comprising introducing into the wellbore a stable aqueous polyethylene emulsion, the polyethylene in said emulsion being the dispersed phase and having at least 10 weight percent of branched carbon atoms in the polymer chain and having a molecular weight in excess of 6,000, the emulsifier in said emulsion being selected from the group consisting of anionic, nonionic, and cationic emulsifiers, said emulsion being introduced into said wellbore in an amount effective to inhibit paraffin deposition without plugging any oil bearing formation in said wellbore.

2. A method according to claim 1 wherein said emulsifier is selected from the group consisting of anionic and nonionic emulsifiers.

3. A method according to claim 1 wherein said emulsifier is selected from the group consisting of alkylphenoxy polyoxyethylene glycol having the structure

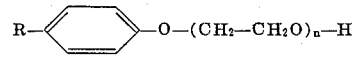

where R is an alkyl group containing eight or nine carbon atoms and $n$ is from 7 to 15, inclusive, water soluble salts of saturated or unsaturated fatty acids having from 12 to 18, inclusive, carbon atoms per molecule, water soluble salts of sulfates of saturated fatty alcohols having from 12 to 18, inclusive, carbon atoms per molecule, and water soluble salts of sulfates of ethoxylated saturated fatty alcohols having from 12 to 18, inclusive, carbon atoms per molecule and combinations thereof.

4. A method according to claim 1 wherein said emulsion after introduction into said wellbore is displaced outwardly of said wellbore into an oil bearing formation.

5. A method according to claim 4 wherein said emulsion is displaced outwardly of said wellbore by increasing the pressure in the interior of said wellbore.

6. A method according to claim 5 wherein said pressure is sufficient to cause fracturing of any oil bearing formation.

7. A method according to claim 5 wherein said pressure is sufficient to force said emulsion into the pores of said oil bearing formation without causing fracturing of any oil bearing formation.

8. A method according to claim 4 wherein said emulsion is broken after displacement into at least one oil bearing formation to cause separation of polyethylene from said emulsion and deposition of said separated polyethylene in said formation.

9. A method according to claim 4 wherein after displacement of said emulsion into at least one oil bearing formation, contacting said emulsion with an amount of salt water effective to cause substantial deposition of polyethylene from said emulsion in the interior of said oil bearing formation.

10. A method according to claim 9 wherein said salt water contains at least about 1000 ppm of dissolved water soluble salts.

11. A method according to claim 9 wherein said salt water is injected into said at least one oil bearing formation from said wellbore after said emulsion is injected into said formation.

12. A method according to claim 9 wherein said salt water is produced from the interior of said at least one oil bearing formation after injection of said emulsion into said formation.

13. A method according to claim 9 wherein sufficient salt water is employed to cause a substantial breakdown of said emulsion as evidenced by agglomeration of polyethylene particles and separation of the agglomerates from the aqueous phase of the emulsion.

14. A method according to claim 4 wherein said emulsifier is selected from the group consisting of alkyl-phenoxy polyoxyethylene glycol having the structure

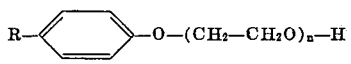

where R is an alkyl group containing eight or nine carbon atoms and $n$ is from 7 to 15, inclusive, water soluble salts of saturated or unsaturated fatty acids having from 12 to 18, inclusive, carbon atoms per molecule, water soluble salts of sulfates of saturated fatty alcohols having from 12 to 18, inclusive, carbon atoms per molecule, and water soluble salts of sulfates of ethoxylated saturated fatty alcohols having from 12 to 18, inclusive, carbon atoms per molecule and combinations thereof.

15. A method according to claim 4 wherein said polyethylene is dispersed in said emulsion in the form of nonoxidized particles in the size range of from about 0.02 to about 0.5 micron, said emulsifier contains less than 1 weight percent molecular oxygen, and said emulsion is substantially free of coagulating agent for said polyethylene particles.

16. A method according to claim 4 wherein said polyethylene emulsion is prepared by the emulsion polymerization of ethylene monomer in an aqueous medium using an effective catalytic amount of at least one water soluble alkali metal persulphate and in the presence of said emulsifier.

17. A method according to claim 4 wherein said emulsion is introduced into said wellbore in an amount of at least about 0.5 gallon.

18. A method according to claim 4 wherein said polyethylene has a molecular weight of at least about 20,000 and is at least about 25 percent branched.

19. A method according to claim 1 wherein said polyethylene is dispersed in said emulsion in the form of nonoxidized particles in the size range of from about 0.02 to about 0.5 micron, said emulsifier contains less than 1 weight percent molecular oxygen, and said emulsion is substantially free of coagulating agent for said polyethylene particles.

20. A method according to claim 1 wherein said polyethylene emulsion is prepared by the emulsion polymerization of ethylene monomer in an aqueous medium using an effective catalytic amount of at least one water soluble alkali metal persulphate and in the presence of said emulsifier.

21. A method according to claim 1 wherein said emulsion is introduced into said wellbore in an amount of at least about 0.5 gallon.

22. A method according to claim 1 wherein said emulsion is introduced into said wellbore in an amount sufficient to provide at least about 0.05 ppm polyethylene in the crude oil produced from the wellbore.

23. A method according to claim 1 wherein said polyethylene has a molecular weight of at least about 20,000 and is at least about 25 percent branched.

24. A method for inhibiting the deposition of paraffin in liquid oil comprising incorporating in said oil a stable aqueous polyethylene emulsion, the polyethylene in said emulsion being the dispersed phase and having at least 10 weight percent of branched carbon atoms in the polymer chain and having a molecular weight in excess of 6,000, the emulsifier in the emulsion being selected from the group consisting of anionic, nonionic, and cationic emulsifiers, said emulsion being incorporated in an effective paraffin deposition inhibiting amount.

25. A method according to claim 24 wherein said emulsifier is selected from the group consisting of anionic and nonionic emulsifiers.

26. A method according to claim 24 wherein said emulsifier is selected from the group consisting of alkyl-phenoxy polyoxyethylene glycol having the structure

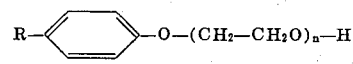

where R is an alkyl group containing eight or nine carbon atoms and $n$ is from 7 to 15, inclusive, water soluble salts of saturated or unsaturated fatty acids having from 12 to 18, inclusive, carbon atoms per molecule, water soluble salts of sulfates of saturated fatty alcohols having from 12 to 18, inclusive, carbon atoms per molecule, and water soluble salts of sulfates of ethoxylated saturated fatty alcohols having from 12 to 18, inclusive, carbon atoms per molecule and combinations thereof.

27. A method according to claim 24 wherein said emulsion is incorporated in said oil in an amount sufficient to provide at least about 0.05 ppm polyethylene in said oil.

28. A method according to claim 24 wherein said polyethylene is dispersed in said emulsion in the form of nonoxidized particles in the size range of from about 0.02 to about 0.5 micron, said emulsifier contains less than 1 weight percent molecular oxygen, and said emulsion is substantially free of coagulating agent for said polyethylene particles.

29. A method according to claim 24 wherein said polyethylene emulsion is prepared by the emulsion polymerization of ethylene monomer in an aqueous medium using an effective catalytic amount of at least one water soluble alkali metal persulphate and in the presence of said emulsifier.

30. A method according to claim 24 wherein said polyethylene has a molecular weight of at least about 20,000 and is at least about 25 percent branched.

* * * * *